United States Patent [19]

Pratt

[11] Patent Number: 5,455,388
[45] Date of Patent: Oct. 3, 1995

[54] ELECTRICAL FLOOR BOX ACCESS COVER

[75] Inventor: Michael L. Pratt, Cordova, Tenn.

[73] Assignee: Thomas & Betts Corporation, Memphis, Tenn.

[21] Appl. No.: 89,159

[22] Filed: Jul. 8, 1993

[51] Int. Cl.[6] .................... H02G 3/12
[52] U.S. Cl. ..................... 174/67; 220/242
[58] Field of Search ............ 174/67; 220/242; 439/136, 142

[56] References Cited

U.S. PATENT DOCUMENTS

| | | |
|---|---|---|
| 707,516 | 8/1902 | Klein . |
| 797,215 | 8/1905 | Osborne et al. . |
| 1,222,493 | 4/1917 | Thomas ............ 174/67 |
| 1,964,513 | 6/1934 | Hemmer ............ 220/32 |
| 3,966,073 | 6/1976 | Geisel ............ 174/67 X |
| 4,159,858 | 7/1979 | Toraya ............ 439/136 |
| 4,228,317 | 10/1980 | Cziment ............ 174/67 |
| 4,289,921 | 8/1981 | Gartner et al. ............ 174/48 |
| 4,721,476 | 1/1988 | Zeliff et al. ............ 439/142 |
| 5,010,211 | 4/1991 | Bartee ............ 174/67 X |
| 5,156,291 | 10/1992 | Mielke ............ 220/254 |

Primary Examiner—Leo P. Picard
Assistant Examiner—David Tone
Attorney, Agent, or Firm—Robert M. Rodrick

[57] ABSTRACT

Covers for outlets in an electrical floor box are connected with an access plate by snap-fit hinge connections. The covers are swingable through arcs greater than 90° during movement from a closed position to an open position or to an inward storage position. Cooperating pimples and dimples on the covers and plate releasably retain the covers in their closed or storage positions.

35 Claims, 4 Drawing Sheets

ELECTRICAL FLOOR BOX ACCESS COVER

FIELD OF INVENTION

This application relates to the art of electrical floor boxes and, more particularly, to access covers for such boxes. Although the invention is particularly suited for use with electrical floor boxes and will be described with specific reference thereto, it will be appreciated that certain features of the invention have broader aspects and can be used in other environments.

BACKGROUND OF THE INVENTION

Electrical floor boxes have access covers or panels that can be opened to provide access to the interior of the box for installing outlets and for making connections to the outlets. The present application concerns an improved access cover assembly for these purposes.

SUMMARY OF THE INVENTION

A cover assembly for electrical floor boxes includes an access plate having an opening therein. The access plate itself is hinged to a frame attached to the box for providing access to the entire interior of the box. The opening in the access plate receives hinged covers for providing access to outlets for making connections thereto.

The improved cover of the present application has a snap-fit hinge connection within the access plate opening. A cover is swingable from a closed position to either of opposite open and storage positions. The cover swings through an arc greater than 90° to each position.

Retaining means is providing for releasably retaining a cover in its closed or storage positions. The retaining means comprises pimples and dimples between the cover sides and the opening sides. The dimples are preferably on the opening sides and the pimples are on the cover sides.

A cover has a free end portion with end surfaces that slope in generally opposite directions. Each sloping end surface extends along approximately one-half of a cover width.

The cover has a hinge end portion that includes an external cylindrical surface extending between cover top and bottom surfaces. Hinge sockets are provided in the opposite sides of the hinge end portion. Grooves extend from the bottom surface of the cover to intersection with the sockets, and the grooves have a depth that is less than the depth of the sockets. The grooves have a depth adjacent the intersection thereof with the cover bottom that is greater than the depth thereof at the intersection thereof with a socket. Thus, the groove bottom slopes from its intersection with a cover bottom surface in a direction outwardly toward a cover side. This provides a cam surface for making a snap connection of the cover sockets with hinge pintle projections on the opening sides.

One sloping end surface on the free end portion of a cover has a terminal end that is located further from the hinge end portion than the terminal end of the other sloping surface. The terminal end that is spaced further from the hinge end portion preferably intersects the cover top surface.

The cover is movable to a storage position that is substantially opposite from its closed position. The cover is then located completely beneath the access plate.

It is a principal object of the present invention to provide an improved access cover assembly for electrical floor boxes.

It is a further object of the invention to provide an improved cover having features that enable making a snap-fit hinge connection within an opening.

It is also an object of the invention to provide an improved cover arrangement that enables selective hinged movement of a cover in opposite directions from a closed position through arcs greater than 90° to open or storage positions.

DESCRIPTION OF A PREFERRED EMBODIMENT

Figure 1:
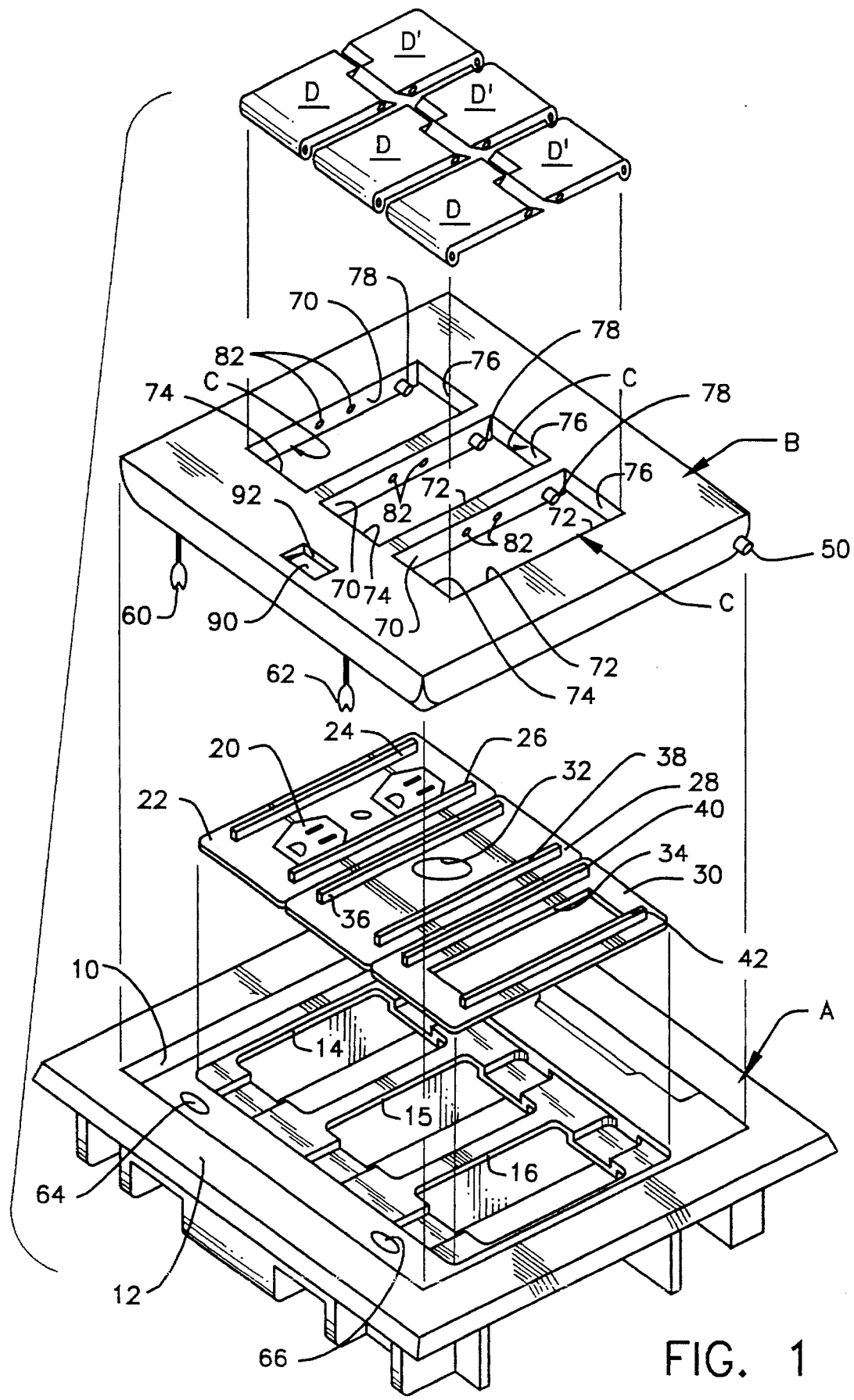
FIG. 1 is a perspective illustration of a cover assembly constructed in accordance with the present invention.

Referring now to the drawings, wherein the showings are for purposes of illustrating a preferred embodiment of the invention only and not for purposes of limiting same, FIG. 1 shows a generally rectangular frame member A that is positionable over the top of an electrical floor box. A central rectangular recess 10 in frame member A provides a horizontal inwardly extending support ledge 12.

A plurality of openings 14, 15 and 16 in frame member A provide access to receptacles in a floor box for making electrical or communications connections therewith. The electrical receptacles or communications receptacles are attachable to frame member A within openings 14–16, and an electrical receptacle is generally indicated at 20.

A support plate 22 has openings therein for receiving the outlets on receptacle 20. Support plate 22 is longer and slightly wider than an opening 14 so that it rests on a peripheral surface of frame member A surrounding an opening 14–16. A pair of elongate spaced-apart ribs 24, 26 extends upwardly from support plate 22 on opposite sides of the openings therein for the receptacle outlets. Ribs 24, 26 are spaced inwardly from the opposite sides of support plate 22 and are also spaced inwardly from the opposite ends of support plate 22.

Additional support plates 28, 30 are provided for openings 15, 16, respectively. Different sizes and shapes of openings 32, 34 may be provided in support plates 28, 30 depending upon the type of electrical or communication receptacle mounted in openings 15, 16. Support plates 28, 30 also have elongate raised ribs 36, 38 and 40, 42 thereon corresponding to ribs 24, 26 on support plate 22.

Figure 2:
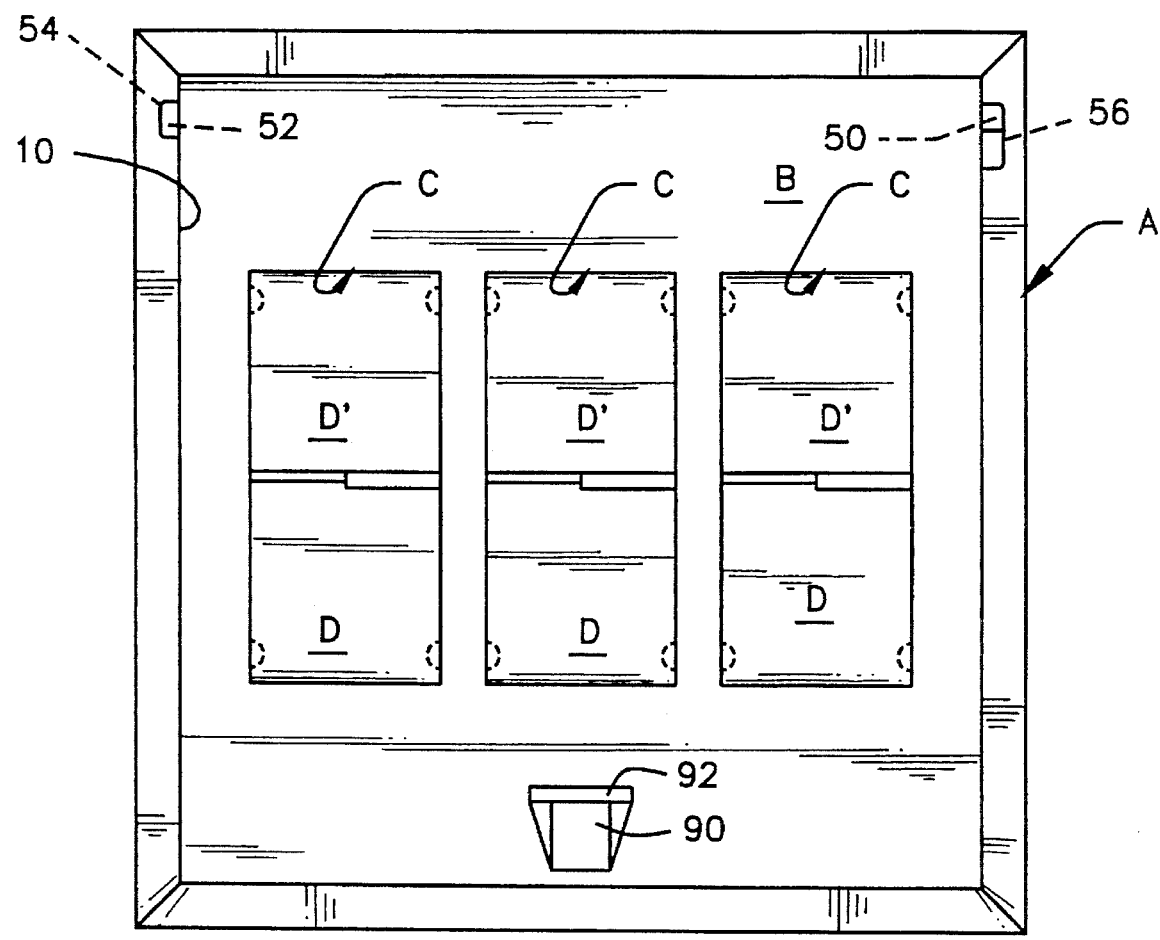
FIG. 2 is a top plan view of a cover assembly constructed in accordance with the present invention with the covers in their closed positions.
Figures 8, 9:
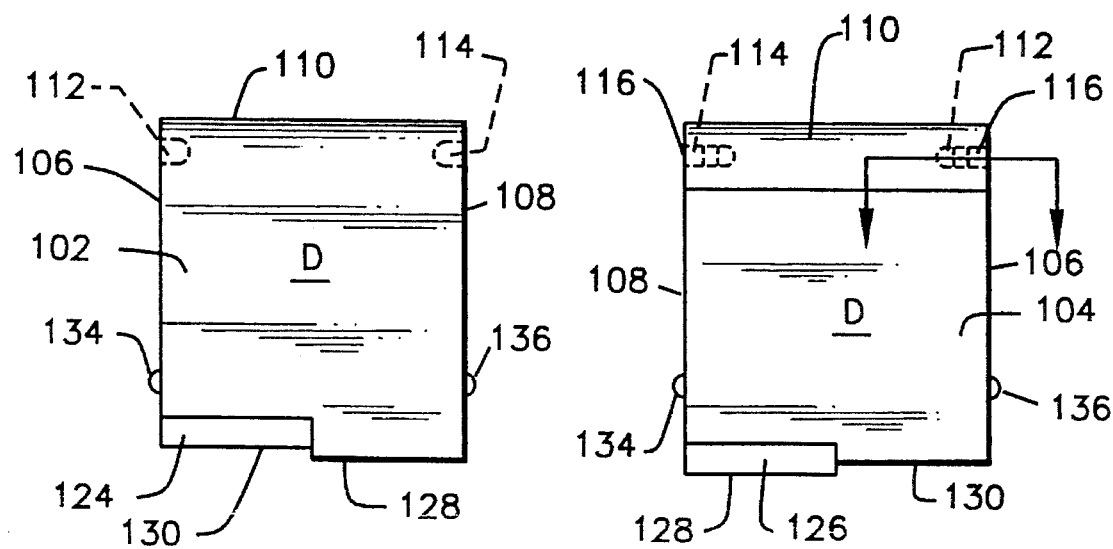
FIG. 8 is a top plan view of a cover.
FIG. 9 is a bottom view thereof.

A rectangular access cover or plate B is dimensioned for close reception within recess 10 in frame member A. In its closed position, access plate B rests on support ledge 12 on frame member A. Access plate B has opposite hinge projections extending outwardly therefrom and only one such hinge projection is shown at 50 in FIG. 1. Referring to FIG. 2, both hinge projections are shown in phantom lines at 50, 52. The peripheral wall of recess 10 in frame member A has a socket opening 54 therein receiving hinge projection 52 and a horizontally elongated slot 56 therein receiving hinge projection 50. Referring back to FIG. 1, latch projections 60, 62 extend downwardly from the underside of access plate B opposite from the end portion of plate B having the hinge projections thereon. Latch projections 60, 62 are a snap fit within holes 64, 66 in support ledge 12 of frame member A.

Figure 3:
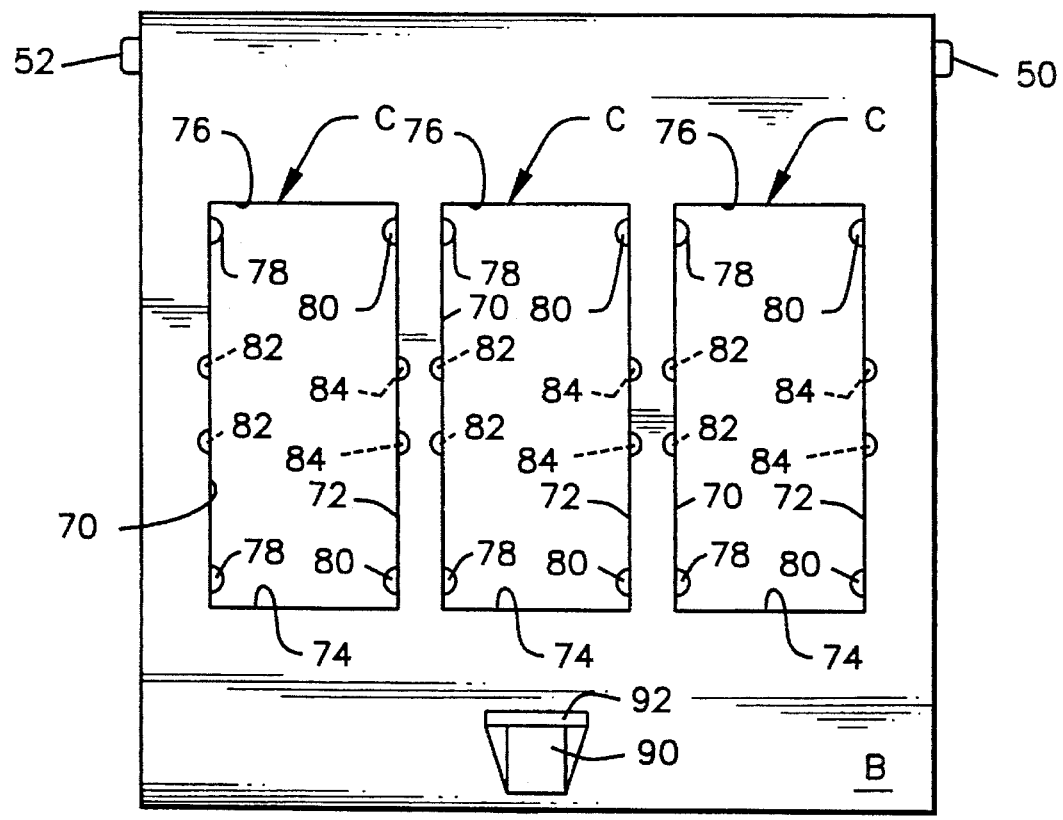
FIG. 3 is a top plan view of a hingeable access plate.

Access plate B has a plurality of spaced-apart rectangular openings C therein. Although three such openings are shown, it will be recognized that a larger or smaller number of such openings may be provided. As shown, however, all of the openings are of the same size and shape, and the same reference numerals and characters will be used to describe all of them. Each rectangular opening has parallel opposite sides 70, 72 and parallel opposite ends 74, 76. Hinge pintle projections 78, 80 (see FIG. 3) extend inwardly from opposite sides 70, 72 adjacent each end 74, 76. Two pair of opposite dimples 82, 84 are provided in opening sides 70, 72. Access plate B has a downwardly inclined recess 90 intersecting an opening 92 for receiving a tool or a person's finger to lift access plate B from its closed position.

As shown in FIGS. 4–7, the opposite sides of rectangular openings C are defined by ribs 94 on the underside of access plate B. These ribs extend beyond the opposite ends 74, 76 of openings C as clearly shown in FIGS. 4–7. In these extended areas adjacent the opposite ends of access plate B, the sides of the ribs are provided with opposite dimples 96 corresponding to dimples 82, 84.

A pair of hinged covers D, D' are provided for each opening C, and each cover D, D' is of the same size and shape. With reference FIGS. 8–11, cover D has top and bottom surfaces 102, 104 and opposite sides 106, 108. A hingeable end portion 110 of cover D has a substantially cylindrical outer peripheral surface that extends between top and bottom surfaces 102, 104. Hingeable end portion 110 also has a thickness substantially greater than the remaining thickness of cover D.

Figures 10, 11:
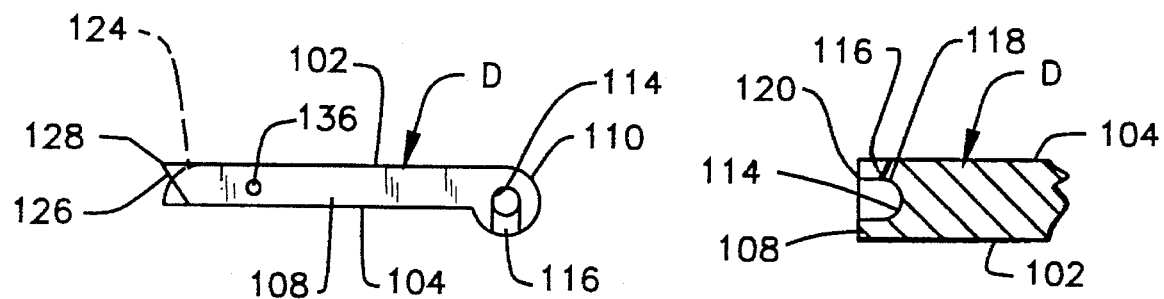
FIG. 10 is a side elevational view thereof.
FIG. 11 is an enlarged partial cross-section elevational view showing a hinge socket and groove in a side of the cover.
Figure 4:
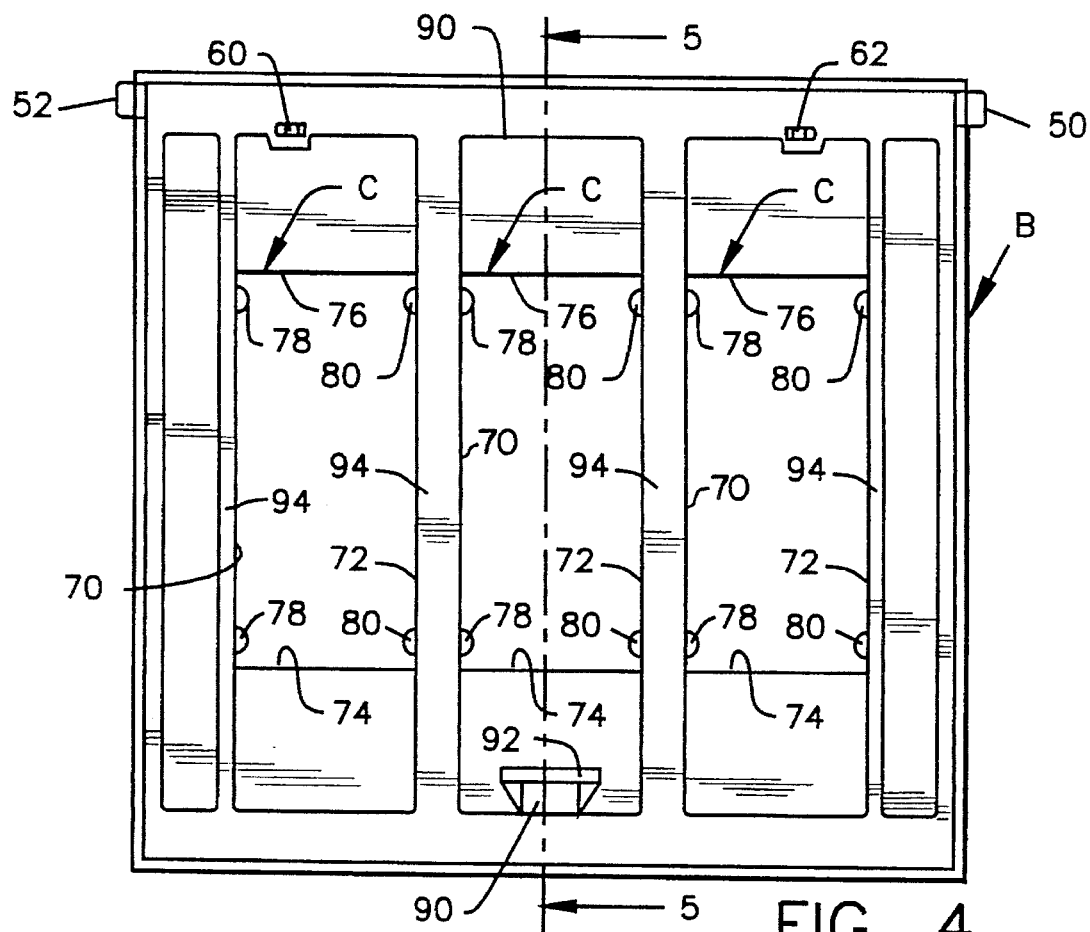
FIG. 4 is a bottom view thereof.
Figure 5:
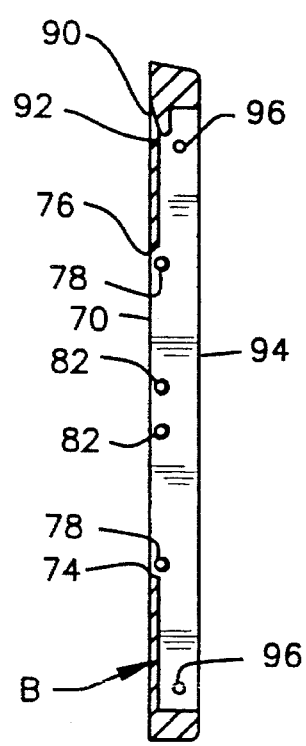
FIG. 5 is a cross-section elevational view taken generally on line 5—5 of FIG. 4.

Hinge sockets 112, 114 are provided in opposite sides 106, 108 at hingeable end portion 110. A groove 116 extends from bottom surface 104 to intersection with each socket 112, 114. As shown in FIG. 11, groove 116 has a depth that is less than the depth of a socket. In addition, the bottom wall of groove 116 slopes from its intersection with bottom surface 104 in a direction outwardly toward a side 106 or 108. As shown in FIG. 11, the groove has a greater depth at its intersection 118 with cover bottom surface 104 than at its intersection 120 with socket 114. Thus, the bottom of groove 116 provides a cam surface to enable snap fitting same into position. A cover is positionable with its hingeable end portion 110 adjacent an opening C and with grooves 116 aligned with hinge 10 projections 78, 80. Force is then applied to the cover until hinge projections 78, 80 snap into hinge sockets 112, 114. The covers are then swingable about their hinge connections.

Each cover D has a free terminal end portion that includes generally oppositely sloping end surfaces 124, 126. Each sloping end surface 124, 126 extends along approximately one-half of the width of a cover between its opposite sides 106, 108. One sloping end surface has a terminal end 128 that intersects top surface 102 and is located further away from hingeable end portion 110 than is the terminal end 130 of sloping surface 124. Each cover is provided with outwardly extending pimples 134, 136 on its opposite side surfaces 106, 108 adjacent the free end portion of the cover. Pimples 134, 136 are receivable in dimples 82, 84 or in dimples 96.

The distance from the axes of hinge pintles 78, 80 to dimples 82, 84 or to dimples 96 is the same as the distance from the axes of sockets 112, 114 to pimples 134, 136.

When covers D, D' are in their closed positions shown in FIG. 2, their top surfaces are substantially flush with the top surface of access plate B. The oppositely inclined end surfaces on covers D, D' make it possible to insert a tool between the ends of the covers when they are closed for prying same open. In their closed positions, the cover pimples 134, 136 are received in opening dimples 82, 84 for releasably retaining the covers in their closed positions. Therefore, the pimples and dimples define releasable retaining means for retaining the covers in selectable positions.

In their closed positions, the bottom surfaces 104 of covers D, D' are supported on ribs 24, 26, 36, 38 and 40, 42 on support plates 22, 28 and 30 in FIG. 1. The length of such support ribs is less than the length of two covers such that the enlarged hingeable end portion of a cover does not contact the support ribs. Only the substantially flat undersurface of each cover is supported on the ribs of the support plates.

Figure 6:
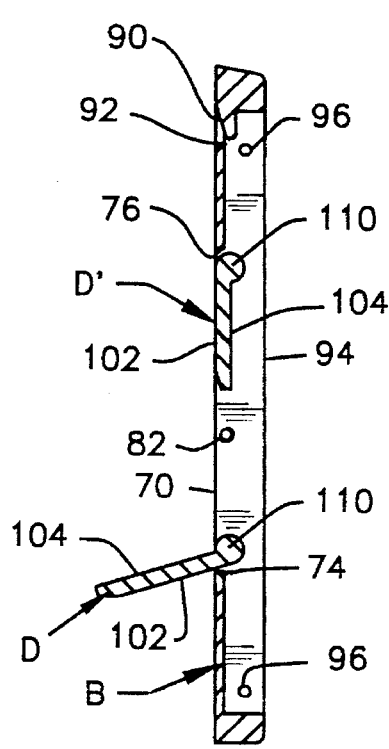
FIG. 6 is a view similar to FIG. 5 and showing one cover in a closed position and another cover in an open position.
Figure 7:
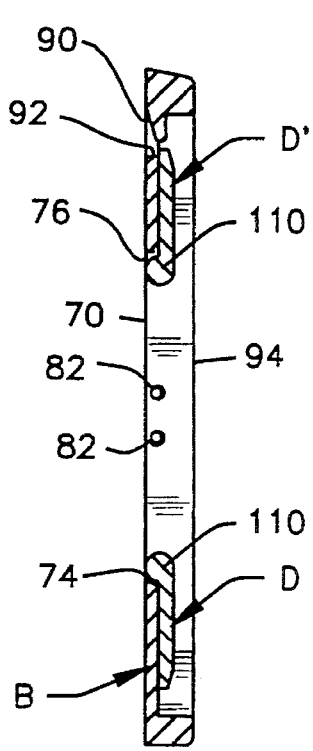
FIG. 7 is a view similiar to FIGS. 5 and 6 and showing a pair of covers in their storage positions.

FIG. 6 shows one cover D in an outward open position with its outer surface 102 abutting an end 74 of a rectangular opening C. In the full open position of a cover, the cover swings through an arc greater than 90°. In the arrangement shown, the arc is approximately 110°. When access plate B is raised, covers D, D' are swingable to storage positions shown in FIG. 7. Pimples 134, 136 on the sides of a cover are receivable in dimples 96 in the storage positions of the covers for releasably holding such covers in their storage positions. Covers D, D' rotate through arcs of approximately 180° during movement from their closed positions to their storage positions. Covers D, D' extend substantially horizontally in parallel opposite directions in their closed and storage positions. In their storage positions, covers D, D' are received in cavities on the underside of access plate B.

Although the invention has been shown and described with respect to a preferred embodiment, it is apparent that variations and modifications will occur to others skilled in the art upon the reading and understanding of this specification. The present invention includes such variations and modifications, and is limited only by the scope of the claims appended hereto.

I claim:

1. A hingeable cover having spaced top and bottom surfaces, a hingeable end portion and a free end portion, said free end portion having two end surfaces thereat each extending obliquely relative to said top and bottom surfaces and sloping in generally opposite directions.

2. The cover of claim 1 wherein said free end portion has a predetermined length and said end surfaces comprise a pair of generally opposite sloping end surfaces, each of said pair of end surfaces extending along approximately one-half of said predetermined length.

3. The cover of claim 2 wherein said pair of end surfaces terminate in terminal ends and one of said terminal ends is spaced further from said hingeable end portion than the other of said terminal ends.

4. The cover of claim 3 wherein said one terminal end that is spaced further from said hingeable end portion intersects said top surface.

5. The cover of claim 1 wherein said hingeable end portion includes opposite sides having hinge sockets therein.

6. The cover of claim 5 wherein said cover bottom surface has grooves extending from said bottom surface to said hinge sockets, said grooves having a depth less than the depth of said sockets.

7. The cover of claim 6 wherein said grooves have sloping bottom surfaces that slope outwardly from said bottom surface toward a said side to intersection with said sockets such that said grooves have a greater depth at the intersection thereof with said bottom surface than at the intersection thereof with said sockets.

8. The cover of claim 6 wherein said hinge sockets are substantially cylindrical and said grooves have a width that is at least as great as the diameter of said sockets.

9. The cover of claim 1 wherein said cover has opposite sides and further including retaining means on said sides for cooperation with retaining means on a cover mounting plate to releasably hold said cover in a desired position.

10. The cover of claim 9 wherein said retaining means comprises detents in said sides, said detents being located closer to said free end portion than to said hingeable end portion.

11. The cover of claim 1 wherein said cover has a substantially greater thickness at said hingeable end portion thereof than over the remaining area thereof.

12. The cover of claim 1 wherein said hingeable end portion has an external surface extending between said top and bottom surfaces that lies on the periphery of a cylinder.

13. A closure assembly including an access plate having an access opening therein, a cover hinged to said plate in said opening for selective swinging movement in opposite directions from a closed position to an outward open position or an inward storage position, and said cover being swingable through an arc greater than 90° during movement thereof to each of said open and storage positions from said closed position.

14. The assembly of claim 13 including integral cooperating retaining means between said cover and plate for releasably retaining said cover in said closed position.

15. The assembly of claim 14 wherein said access opening has a periphery and said cover has opposite sides, and said retaining means comprises cooperating pimples and dimples between said periphery and said sides.

16. The assembly of claim 13 including integral cooperating retaining means between said cover and plate for selectively releasably retaining said cover in said closed position or said storage position.

17. The assembly of claim 16 wherein said access opening has a periphery and said cover has opposite sides, said retaining means comprising cooperating pimples and dimples between said periphery and said sides.

18. The assembly of claim 17 wherein said dimples are on said periphery of said access opening and said pimples are on said sides of said cover.

19. The assembly of claim 13 wherein said cover in said storage position thereof is substantially parallel to said cover in said closed position thereof.

20. The assembly of claim 13 wherein said access opening has a periphery and said cover has opposite sides, and integral snap-fitting hinge means between said cover sides and said periphery of said access opening.

21. The assembly of claim 20 wherein said hinge means comprises opposite hinge sockets in said cover receiving opposite hinge pintles on said periphery of said access opening.

22. The assembly of claim 21 wherein said cover has opposite sides and top and bottom surfaces, said hinge sockets being in said sides, grooves in said sides between said sockets and said bottom surface, and said grooves having a depth less than the depth of said sockets and a width at least as great as the diameter of said sockets.

23. The assembly of claim 22 wherein the depth of said grooves is greater at the intersection thereof with said bottom surface than at the intersection thereof with said sockets.

24. The assembly of claim 13 including a support plate beneath said cover for supporting same in said closed position thereof.

25. The assembly of claim 24 wherein said support plate has a pair of substantially parallel raised ribs on which said cover is supported.

26. The assembly of claim 25 including an opening said support plate between said ribs.

27. A closure assembly for an electrical floor box, said assembly including an access plate having a substantially rectangular opening therein, said opening having opposite sides and opposite ends, a pair of covers hinged to said plate in said opening adjacent said opposite ends of said opening, said covers being of substantially the same size and shape, and snap-fitting projections and sockets on said plate and covers for hingeably connecting said covers to said plate, said covers being selectively movable from a closed position closing said opening to an outward open position or an inward storage position.

28. The assembly of claim 27 wherein said covers have opposite sides and said sockets are in said cover sides and said projections extend outwardly from said sides of said opening adjacent said ends of said opening.

29. The assembly of claim 28 wherein said covers have bottom surfaces, grooves in said cover sides extending between said bottom surfaces and said sockets, and said grooves having a depth less than the depth of said sockets.

30. The assembly of claim 29 wherein said grooves have a depth at the intersection thereof with said bottom surfaces that is less than the depth thereof at the intersection thereof with said sockets, and said grooves have a width at least as great as the diameter of said sockets.

31. The assembly of claim 27 wherein said covers having free terminal end portions that terminate in oppositely inclined end surfaces.

32. The assembly of claim 27 wherein said covers have top and bottom surfaces and enlarged hingeable end portions, and said hingeable end portions having external cylindrical surface portions extending between said top and bottom surfaces.

33. The assembly of claim 27 wherein each of said open and storage positions is more than 90° from said closed position.

34. The assembly of claim 27 including releasable retaining means for releasably retaining said covers in said closed positions or said storage positions.

35. The assembly of claim 34 wherein said covers have opposite sides and said retaining means comprises cooperating pimples and dimples on said cover sides and on said sides of said opening in said access plate.

* * * * *